(12) United States Patent
Reichel et al.

(10) Patent No.: US 8,534,958 B2
(45) Date of Patent: *Sep. 17, 2013

(54) OFFSHORE STATION, FOUNDATION FOR AN OFFSHORE STATION, AND METHOD FOR BUILDING AN OFFSHORE STATION

(75) Inventors: Dieter Reichel, Neumarkt (DE); Stefan Bogl, Sengenthal (DE)

(73) Assignee: Max Bögl Bauunternehmung GmbH & Co. KG, Sengenthal (DE)

(*) Notice: Subject to any disclaimer, the term of this patent is extended or adjusted under 35 U.S.C. 154(b) by 0 days.

This patent is subject to a terminal disclaimer.

(21) Appl. No.: 13/435,557

(22) Filed: Mar. 30, 2012

(65) Prior Publication Data

US 2012/0243943 A1    Sep. 27, 2012

Related U.S. Application Data

(63) Continuation of application No. 13/062,325, filed as application No. PCT/EP2009/061043 on Aug. 27, 2009.

(30) Foreign Application Priority Data

Sep. 5, 2008 (DE) .......................... 10 2008 041 849

(51) Int. Cl.
*E02B 17/02* (2006.01)

(52) U.S. Cl.
USPC .......................................... 405/205; 405/204

(58) Field of Classification Search
USPC ............... 405/195.1, 203, 204, 205, 206, 209
See application file for complete search history.

(56) References Cited

U.S. PATENT DOCUMENTS

| 3,698,198 | A | * | 10/1972 | Phelps | 405/204 |
|---|---|---|---|---|---|
| 4,155,671 | A | * | 5/1979 | Vos | 405/203 |
| 4,314,776 | A | * | 2/1982 | Palmer et al. | 405/205 |
| 4,639,167 | A | * | 1/1987 | Petty et al. | 405/203 |
| 4,696,601 | A | * | 9/1987 | Davenport | 405/203 |
| 4,701,075 | A | * | 10/1987 | Martyshenko et al. | 405/204 |
| 4,749,309 | A | * | 6/1988 | Olsen | 405/204 |
| 4,778,308 | A | * | 10/1988 | Stove | 405/204 |
| 4,810,135 | A | * | 3/1989 | Davenport et al. | 405/204 |

(Continued)

FOREIGN PATENT DOCUMENTS

| DE | 2 359 540 | 6/1974 |
|---|---|---|
| DE | 102 06 585 A1 | 8/2003 |

(Continued)

OTHER PUBLICATIONS

German Patent Office Search Report, Jun. 16, 2009.

(Continued)

*Primary Examiner* — Frederick L Lagman
(74) *Attorney, Agent, or Firm* — J. Bennett Mullinax, LLC (57) ABSTRACT

An offshore wind power station has a floatable foundation that can be sunk by flooding a hollow chamber, and a superstructure on which functional units of the station are arranged. The foundation includes a base that projects from the water surface in the sunk state of the foundation and on which the superstructure can be mounted. A floodable floating device surrounds the base in the shape of a ring. In a method for building an offshore station a floatable foundation is prefabricated in a harbor zone, is towed to a mounting location and sunk, whereupon the station is completed with a superstructure and functional units at the mounting location.

19 Claims, 5 Drawing Sheets

(56) References Cited

U.S. PATENT DOCUMENTS

| | | | |
|---|---|---|---|
| 5,316,413 A | 5/1994 | Sisodiya et al. | |
| 5,823,714 A * | 10/1998 | Chattey | 405/204 |
| 6,371,695 B1 * | 4/2002 | Davenport et al. | 405/204 |
| 7,234,409 B2 * | 6/2007 | Hansen | 405/203 |
| 7,674,073 B2 * | 3/2010 | Heskin et al. | 405/204 |
| 2001/0036387 A1 * | 11/2001 | Richter et al. | 405/205 |

FOREIGN PATENT DOCUMENTS

| | | |
|---|---|---|
| DE | 10 2006 002 780 A1 | 7/2007 |
| DE | 20 2004 021 468 U1 | 6/2008 |
| DE | 10 2007 002 314 A1 | 7/2008 |
| FR | 2 887 900 | 1/2007 |
| GB | 2 398 543 A | 8/2004 |
| WO | WO 02/92425 A1 | 11/2002 |

OTHER PUBLICATIONS

Article —Support Structures for an Offshore Array of Vertical Axis Wind Turbines, Wind Engineering vol. 10, No. 1, 1986.

PCT Search Report, May 20, 2010.

International Preliminary Report on Patentability, Mar. 21, 2011.

* cited by examiner

OFFSHORE STATION, FOUNDATION FOR AN OFFSHORE STATION, AND METHOD FOR BUILDING AN OFFSHORE STATION

CROSS-REFERENCE TO RELATED APPLICATION

The present application is a Continuation Application of U.S. patent application Ser. No. 13/062,325, filed Mar. 4, 2011.

FIELD OF THE INVENTION

The invention refers to an offshore station, especially an offshore wind power station that comprises a floatable foundation that can be sunk by flooding a hollow chamber and a superstructure on which functional units, especially a wind power station gondola and rotor, are arranged. Furthermore, the invention refers to a foundation of an offshore station and a method for building an offshore station, especially an offshore wind power station in which a floatable foundation is prefabricated in a harbor zone, transported after completion to a mounting location, and sunk there. Subsequently, the station with the superstructure and functional units, especially a gondola and a rotor of a wind power station, is completed at the mounting location.

BACKGROUND OF THE INVENTION

Various methods for building offshore wind power stations are known. In some of them, steel caissons or reinforced concrete built on land are used for different types of seafloors. The caisson foundations can float and are transported to the mounting places with loading cranes. Once in their mounting positions, the caissons are filled with sand, pebbles or other dense materials so they can have the needed weight. In this case, the wind power station itself is generally fully mounted in a nearby port and transported to the mounting location, where the towers of the wind power station are raised with floating cranes and mounted onto the foundation. The use of floating cranes is relatively expensive and the transportation and erection of the tower depend strongly on weather conditions.

DE 10 2007 002 314 A1 envisages a foundation for an offshore station prefabricated on land or, if applicable, a fully prefabricated wind power station hung with ropes in an especially equipped transportation ship so it can be attached to the foundation. The foundation includes an immersion body whose buoyancy can be increased so the special ship can tow the foundation to the mounting location, where it is sunk by loosening the suspension. The transportation ship, in turn, detaches from the foundation so it can move away from the mounting location. The specially built ship can be designed merely as a swimming body without own propulsion and must then be brought to the mounting location by another ship. In this scenario, the foundation and the station itself cannot float.

DE 102 06 585 A1 and DE 2 359 540 envisage the building of a floatable foundation partially on land or in a harbor zone, bringing it to the mounting location to be sunk there. In each case, the floatable foundation is sunk by flooding and, if need be, anchored to the seafloor by flushing. In DE 2 359 540, a likewise floatable tower superstructure (prefabricated on land) is positioned on top of this foundation float. The tower superstructure is towed in horizontal position to the mounting location, raised there through controlled flooding (with the help of special lifting devices if need be) and lowered slowly to a corresponding foundation recess. Only then can a superstructure be mounted on the tower, which is designed for oil extraction in DE 2 359 540. The superstructure is also prefabricated on land or in a harbor, towed to the mounting location and mounted there onto the tower.

DE 102 06 585 A1 describes a tower foundation consisting of numerous cylinder-shaped chambers that can be individually flooded. The tower foundation is prefabricated on land and towed in resting position to its mounting location, where the chambers are flooded in a controlled way, the tower foundation raised to the vertical position, and sunk. However, the tower foundation juts out from the water surface for receiving the superstructure of the offshore station. Since the sinking process greatly affects floating stability, an external stabilization is provided for.

The task of this invention is to suggest an offshore station with a floatable foundation and a corresponding, easily built foundation that can be transported to the mounting location. Furthermore, a method for achieving this task will also be suggested.

SUMMARY

Additional objects and advantages of the invention will be set forth in part in the following description, or may be obvious from the description, or may be learned through practice of the invention.

An offshore station, especially an offshore wind power station, encompasses a floatable foundation that can be sunk by flooding a hollow space and a superstructure on which the station's functional units are arranged. The station can be an offshore wind power station on whose tower the foundation is mounted. In turn, the gondola and rotor are mounted as functional units on the tower. According to the invention, the foundation includes a bottom slab and a base arranged on it. When the foundation has been sunk, the base juts out from the water surface so that the superstructure can be easily mounted on it above the surface. Furthermore, the foundation includes a preferably ring-shaped floating body constructed around the base that can be flooded. Owing to the preferably ring-shaped floating body, a favorable center of gravity in the foundation with respect to the base can be achieved in spite of the latter's height. Thus, the foundation is particularly stable when floating and can be towed to the mounting location in the position that it will be installed. The favorable center of gravity of the foundation can also allow it to be sunk at the mounting location without external stabilization. In this case, the base of the station can also be directly attached to the bottom slab already when the foundation is being prefabricated, thus doing away with the hook-up work at the mounting location.

A floatable foundation is prefabricated in a harbor area in an offshore station erection. After its completion, the floatable foundation is towed to a mounting location where it will be sunk. Afterwards, the station is completed at the mounting location by adding a superstructure, which can be the tower of a wind power station and its functional units like a gondola and rotor, for example. According to one embodiment of the invention, a bottom slab is covered with concrete in the harbor area. Then, the base of the superstructure is mounted on it, and after the base mounting has been completed, an annular-shaped floating body built around the base is mounted on the bottom slab and/or base. Thus, the foundation encompasses the station's entire support, which extends barely above the water surface. The method according to the invention allows the entire foundation with the base to be already prefabricated onshore or on a floating pontoon in the harbor area. Likewise, the foundation can be finished in a dry dock and then dropped into the water.

The base is preferably built in the harbor area from concrete components that allow the foundation to be very easily and quickly constructed to avoid long and costly harbor lay times. The concrete components can be economically prefabricated and transported to the harbor without special transportation but a base already pre-mounted on land can be mounted on the bottom slab, to finish the work done on the bottom slab very quickly. The base can also be built up of concrete components.

In this case, it is preferable for the floating body to be made primarily of pre-assembled units, if possible of concrete components, because then all foundation components can be pre-fabricated economically on land and quickly mounted in the harbor area. This can greatly reduce the needed mounting time in the harbor area.

Here, it is preferable if at least one external ring wall of the floating body is constructed on the bottom slab applying the prefabricating method. In principle, however, the outer ring wall could also be constructed in the cast-in-situ concrete. In this case, it is very advantageous if the ring wall is mounted directly on the bottom slab so the latter is simultaneously the bottom of the floating body. With this method, the foundation can be built up very easily.

A floating body cover slab can also be mounted in pre-cast or cast-in-situ concrete on the outer ring wall. If the cover slab is made with the pre-cast construction method, it is advantageous for the prefabricated parts to have a segmented ring shape so they can be easily arranged around the base. The individual concrete components of the ring wall and the base can also have a segmented ring shape for convenient mounting and a stable construction can be built on them. However, the concrete components of the base can also have a full ring shape. It is also possible to make the individual concrete components as rectangular, flat plates, mounted in bracing position against one another to create a ring wall. In any case, an advantageous and fast mounting is possible by constructing the foundation out of concrete components in the harbor area. These components can be cheaply prefabricated outside the harbor and easily assembled together to create a floating and stable foundation. As the base has already been integrated into the foundation, difficult construction work that would have to be performed after sinking the foundation is no longer needed. Nonetheless, owing to its floating and stable construction, the foundation can be easily transported to the mounting location.

So the floating body can be stabilized during sinking, it is advantageous if it is subdivided by partition walls that create ring-segmented chambers that can be individually flooded.

According to another execution of the invention, it is also advantageous for the floating body to especially have the form of several closed annular segmented containers. The containers can also be flooded in a controlled way for allowing sinking and be filled with filling material, if need be. Once the foundation has been sunk, they can be easily detached and reused for erecting other stations.

Another execution of the invention envisages the floating body to be made of several closed, barrel-shaped containers annularly arranged around the base. The containers can be made quite economically and reused for other stations regardless of the base dimensions.

Furthermore, the floating body can also consist of several floatable buoyancy bodies, preferentially made of concrete components. Even these can be executed so they can be detached.

The floating body and the steel or concrete containers can be executed so they are only partly detachable so a section of the floating body or the container can be ballasted and another section reused. For construction reasons, sections of the floating body can also remain in the sunk foundation or used for creating a biotope.

After completing the foundation with the base and the floating body, the foundation in mounting position can be towed from the harbor area in a floating pontoon, for example, launched, then towed to the mounting location and finally sunk by flooding the floating body in its mounting position. In this case, a raising or external stabilization with floating cranes or the like is not necessary. The foundation can also, however, be constructed entirely on land or in a dry dock and then launched.

Preferably, the foundation is sunk to the seafloor by flooding the floating body. To sink the foundation, it is also advantageous if an interior space of the wind power station base can be flooded.

Besides, it can be advantageous if an interior space of the floating body and/or base can be filled with filling material to increase the weight of the foundation.

However, instead of sinking the structure to the seafloor and depending on the configuration of the soil, it can also be advantageous to sink the floatable foundation by flooding the floating body on piles because they allow a positioning on the floor even with bad soils. In addition, a favorable scour protection can be simultaneously achieved in this case because water can flow through the piles under the foundation. Here, it is advantageous to build three piles in the floor with mainly the exact height. To position the foundation on the piles, it can be tensioned against the piles with a fastening device and adjusted, if need be. Afterwards, a space between the piles and an underside of the foundation is preferably filled with concrete.

According to another favorable embodiment of the invention, the foundation's floating body is removed after sinking. In this case, the foundation has a heavy bottom slab for sufficient weight that needs no sand or pebble filling. The floating body can be easily detached if it consists of several closed containers.

Besides, it is advantageous for the bottom slab to have an annular contact area because the weight distribution below the surface would then be especially easy to carry out. If the bottom slab is conical, a sufficient weight of the bottom slab can nevertheless be achieved.

It is also advantageous if the station is built preferentially from annularly segmented concrete components, as these can be economically prefabricated in large numbers and easily transported to the construction site.

According to another advantageous further development of the invention, the concrete components of the structure and/or base are clamped dry against one another and/or the bottom slab. In this case, a sealing with epoxy is not necessary. It is better if the contact points of the concrete components are ground over before clamping so the concrete components can lie flat on top of each other. However, sealing can nonetheless take place depending on how the concrete components are executed.

It is furthermore advantageous if the contact points have at least a partial shear interlocking or profiling. In addition to absorbing forces, the shear interlocking can also serve for putting the concrete components together with precision.

It is furthermore advantageous for the base to have an annular fastening flange for fastening a steel tower. The flange can be prefabricated on land and mounted whole on the base.

It is also advantageous if after sinking the foundation an interior space of the base and/or the floating body is pumped dry. The interior space of at least the base can thus be used for storage purposes or for putting the station's technical parts.

Likewise, it can also be advantageous, however, to fill the interior space of the base and/or floating body with filling material such as sand or pebbles after sinking.

BRIEF DESCRIPTION OF THE DRAWINGS

Other advantages of the invention are described with the help of the embodiments shown in the following figures, which show.

DETAILED DESCRIPTION

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

Figure 1:
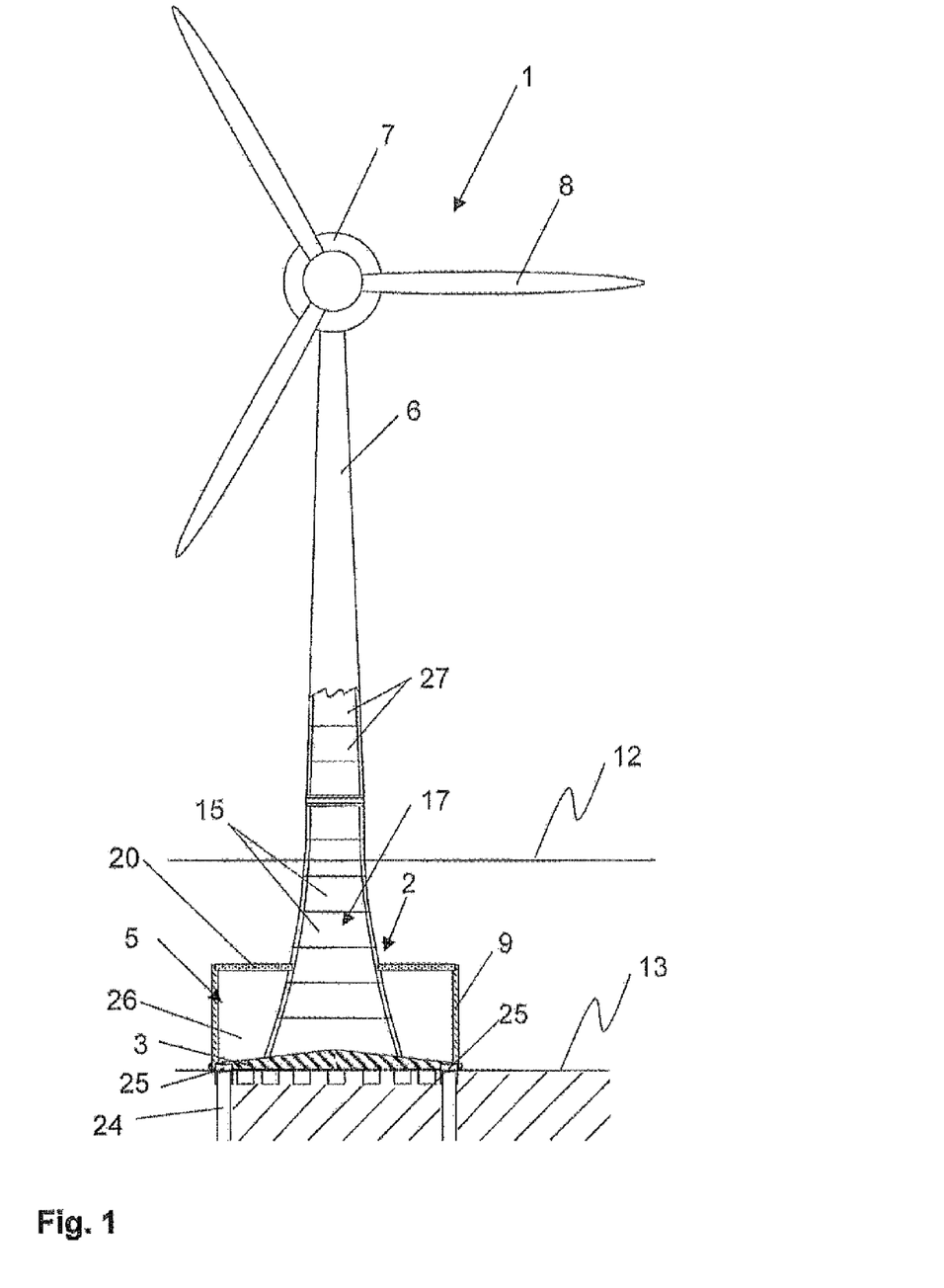
FIG. 1 An overview of the off-shore station according to the invention.

FIG. 1 shows a schematic diagram of an offshore station 1 according to certain embodiments of the invention in a partial section. The station 1 at hand is executed as a wind power station on a foundation 2 according to the invention, but another structure or station 1 like a drilling platform or something similar can also be built up on the foundation instead of a wind power station.

The wind power station 1 encompasses a floatable foundation 2 that in this drawing includes a bottom slab 3, a base 4 (FIG. 2) and a floating body 5. Furthermore, the wind power station 1 includes a tower 6, a machine gondola 7 and a rotor 8. Instead of the tower 6 of the wind power station 1, another superstructure 6 with the respective functional units can also be built up on the foundation, of course.

Figure 2:
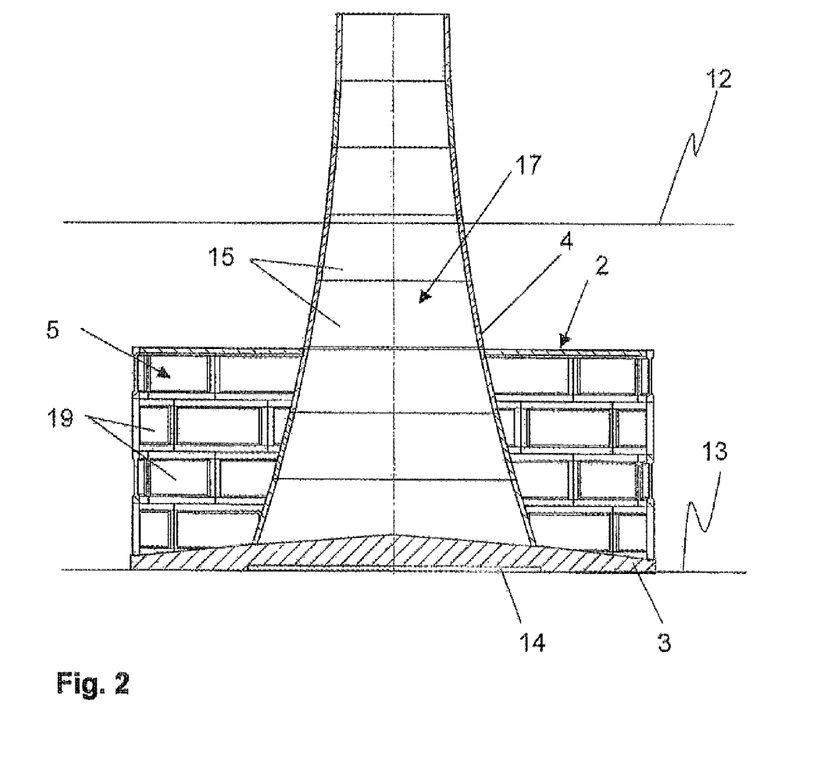
FIG. 2 A section drawing of the foundation according to the invention.
Figure 3:
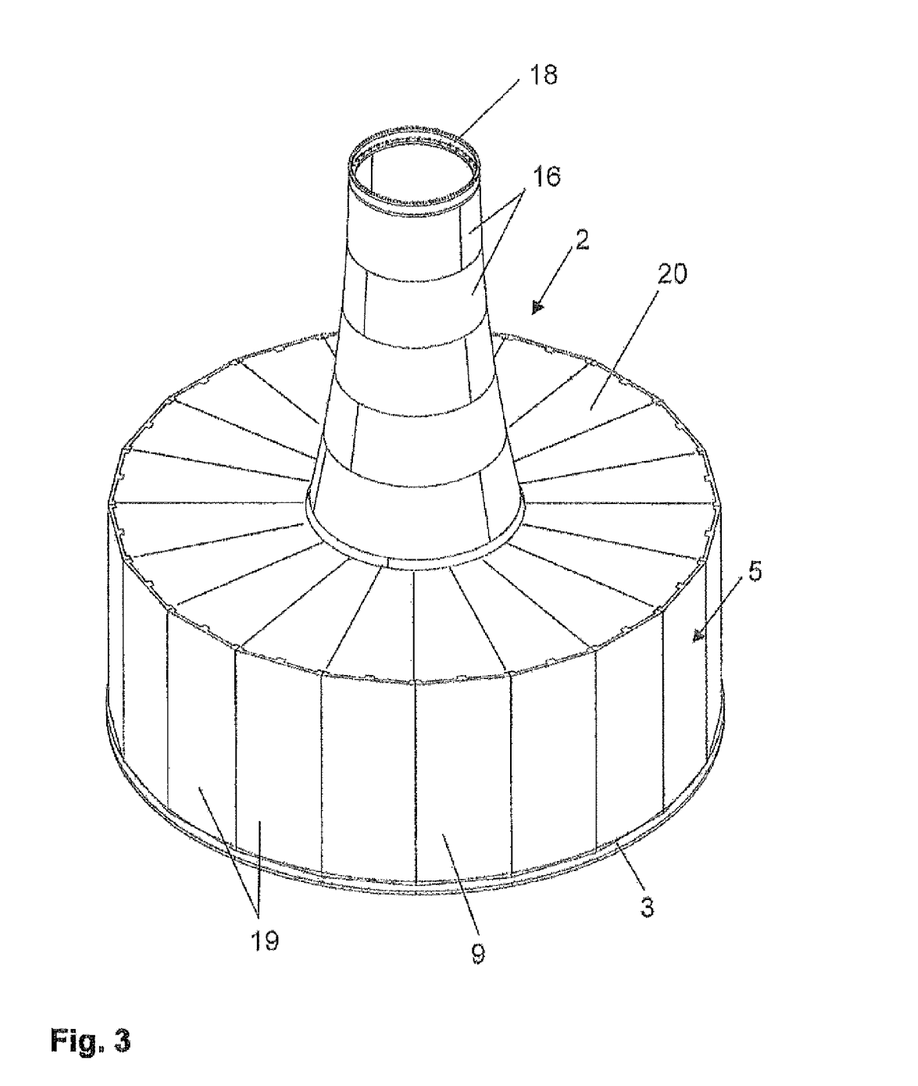
FIG. 3 Another execution of the foundation.

The floatable foundation 2, shown in a section drawing in FIG. 2 and an alternate execution of it in a perspective drawing in FIG. 3, encompasses a stable bottom slab 3 made preferentially of concrete and having a conventional reinforcement. In this case, the bottom slab 3 is round and has an approximate diameter of 30 to 35 meters.

The underside of the bottom slab can have a recess 14 so that the bottom slab 3 has an annular contact surface as can be seen in FIG. 2. In addition, the bottom slab 3 can have a slightly conical shape. As a result of this, a favorable load-bearing capacity can be achieved in the bed of the seafloor 13 if the bottom slab 3 has a considerable weight. In this case, the bottom slab can be made of in-situ concrete in land and afterwards taken on a floating pontoon to a small inner harbor or preferably placed in in-situ concrete on a floating pontoon. Afterwards, the base 4 is braced on the bottom slab 3 with bracing elements on the floating pontoon located in the inner harbor area. In this scenario, the base 4 can already be prefabricated on land and braced only against the bottom slab 3 in the inner harbor area or it can be built from concrete components 15 on the floating pontoon located in the inner harbor area.

In the illustrated embodiment of FIG. 2, the individual concrete components 15 of the base consist here of individual annular segments, and each segment in turn can consist of several ring segments 16, as shown in FIG. 3. To brace the base 4 on the bottom slab 3, grooves for the bracing elements can be arranged in a known way in the wall of the concrete components 15 or the annular segments 16. Instead of guiding the pre-stressing elements in the wall, it is also possible, however, to arrange the pre-stressing elements outside of the wall in the interior space 17 of the base or outside of the base 4. In this case, the pre-stressing elements running along the interior space 17 of the base 4 can be arranged economically and at the same time protected from corrosion. Likewise, the pre-stressing elements led in channels in a known way can be tightly pressed in with a filling material after bracing to achieve protection against corrosion. Likewise, the annular segments 16 are braced with clamping devices and afterwards pressed in if need be. To prevent the grouting agent from seeping out, sealing agents can also be arranged in this case if necessary.

After mounting the base 4 on the bottom slab 3, the floating body 5 of the foundation 2 is mounted on the floating pontoon (not shown). According to an embodiment of the invention, the floating body 5 consists likewise mainly of concrete components 19 that are also prefabricated and can be quickly mounted in the inner harbor area. In this case, the floating body 5 is constructed in an annular shape around the base 4 on the bottom slab. As a result of this, it is on the one hand possible to anchor the base 4 onto the bottom slab 3 independently from the floating body 5 and, if desired, to remove the floating body 5 after sinking the foundation 2. If necessary, however, the floating body can also be filled with filling material to achieve sufficient weight in the foundation to be sunk.

However, the annular geometry of the floating body 5, in particular, can achieve a favorable center of gravity in the foundation 2. Thus, it is possible to finish the foundation 2 with the floating body 5 and the base 4 in full mounting position already in the harbor area, splash it down, tow it to the mounting location and then sink it in mounting position too. Thanks to the design according to the invention, the foundation is particularly stable when it floats and can also be easily constructed from prefabricated parts for fast mounting in the harbor area.

The concrete components 19 of the floating body can in this case be arranged similarly to those of the base 4 as annular segments, as shown in FIG. 2. However, as an alternative shown in FIG. 3, the concrete components 19 can also be made of individual rectangular plates. In this case, the concrete components 19 of the floating body are also braced against one another and against the bottom slab 3 with suitable clamping devices. According to another alternative (not shown), it is also possible to cast an outer ring wall 9 of the floating body 5 in in-situ concrete on the bottom slab 3.

Figure 4:
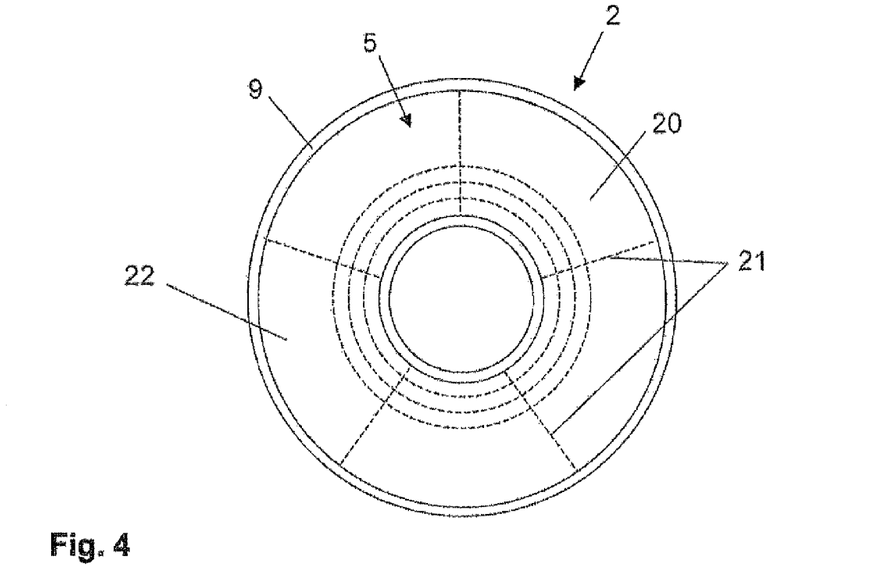
FIG. 4 A top view of a foundation of an offshore station according to the invention.

After mounting the ring wall 9 of the floating body 5, a cover slab 20 of the floating body 5 can be mounted onto the ring wall 9. In this case, the cover slab 20 can be a continuously annular cover slab 20, as the top view of FIG. 4 shows, or executed as an element cover, as can be seen in FIG. 3. In this case, the cover slab 20 can consist of individual annularly segmented prefabricated parts. A combination of prefabricated and in-situ cast concrete construction is also possible.

As especially apparent in the sectional drawing of FIG. 2, the floating body here is built up in such a way that the bottom slab 3 is at the same time the bottom of the floating body 5.

FIG. 4 shows a top view of a foundation of a wind power station according to a particular embodiment of the invention, in which case the cover slab 20 has been executed annularly in in-situ concrete. Broken lines represent the wall sections of the base 4 that widen downward. As FIG. 4 also shows, individual bulkhead walls 21 can be arranged in the floating body 5 for stabilizing the floating body 5. In this case, the bulkhead walls 21 can also be prefabricated as concrete components. The bulkhead walls 21 are preferentially arranged in such a way that individual annularly segmented chambers 22 are the result. On the one hand, the bulkhead walls 21 increase the stability of the floating body 5 and, on the other hand, facilitate a selective flooding at the mounting location so the foundation 2 can be sunk in mounting position without the risk of tilting. For this purpose, each chamber 22 has at least one opening or the corresponding valves (not shown) to make a selected flooding possible.

Figure 5:
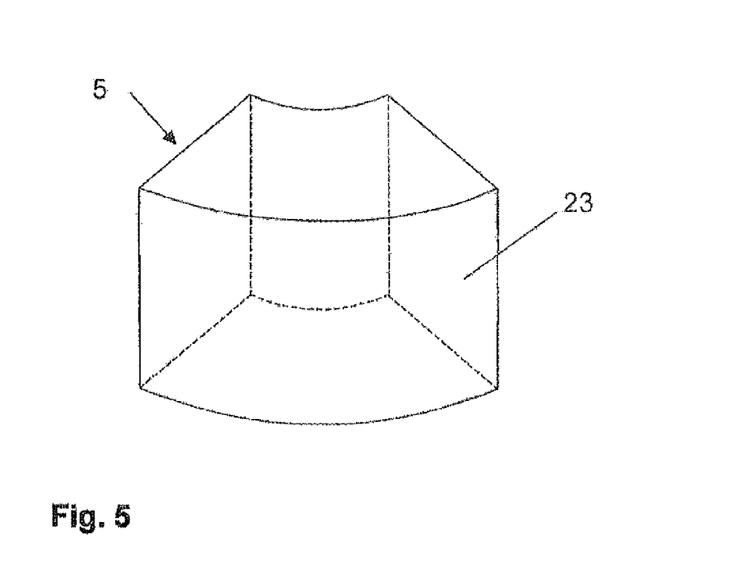
FIG. 5: A perspective drawing of a container as part of a floating body.

FIG. 5 shows a perspective drawing of an alternative design of the floating body 5. Here, the floating body 5 is made from several preferentially annularly segmented containers 23 arranged around the base 4 and fastened to the bottom slab 3 and/or the base 4. In this case, the floating body 5 can be very easily loosened and then detached from the foundation slab after sinking the foundation 2. For this, the bottom slab 3 is executed so heavily that it still weighs enough after the flooded floating body 5 has been removed. The execution with individual containers 23 is therefore especially suitable for smaller wind power stations 1. The containers 23 also have one or several openings or valves for selective flooding. For dismounting the floating body 5 or the containers 23, it is advantageous if the interior space of the container can be pumped dry to increase buoyancy and transport the containers 23 to the water surface. The containers 23 can in this case be reused in other wind power stations 1 to be erected. Preferably, the containers 23 are executed as steel containers, but floatable containers or buoyancy elements made of concrete or concrete components can also be similarly used. Since costly artificial biotopes and reefs are very often constructed, it is also conceivable to leave the floating body 5 on the foundation after sinking and to open it in various places to create a biotope through water exchange. Depending on location, however, the containers of the floating body can also remain on the foundation that has been sunk and be used for ballast purposes in their final state.

Figure 6:
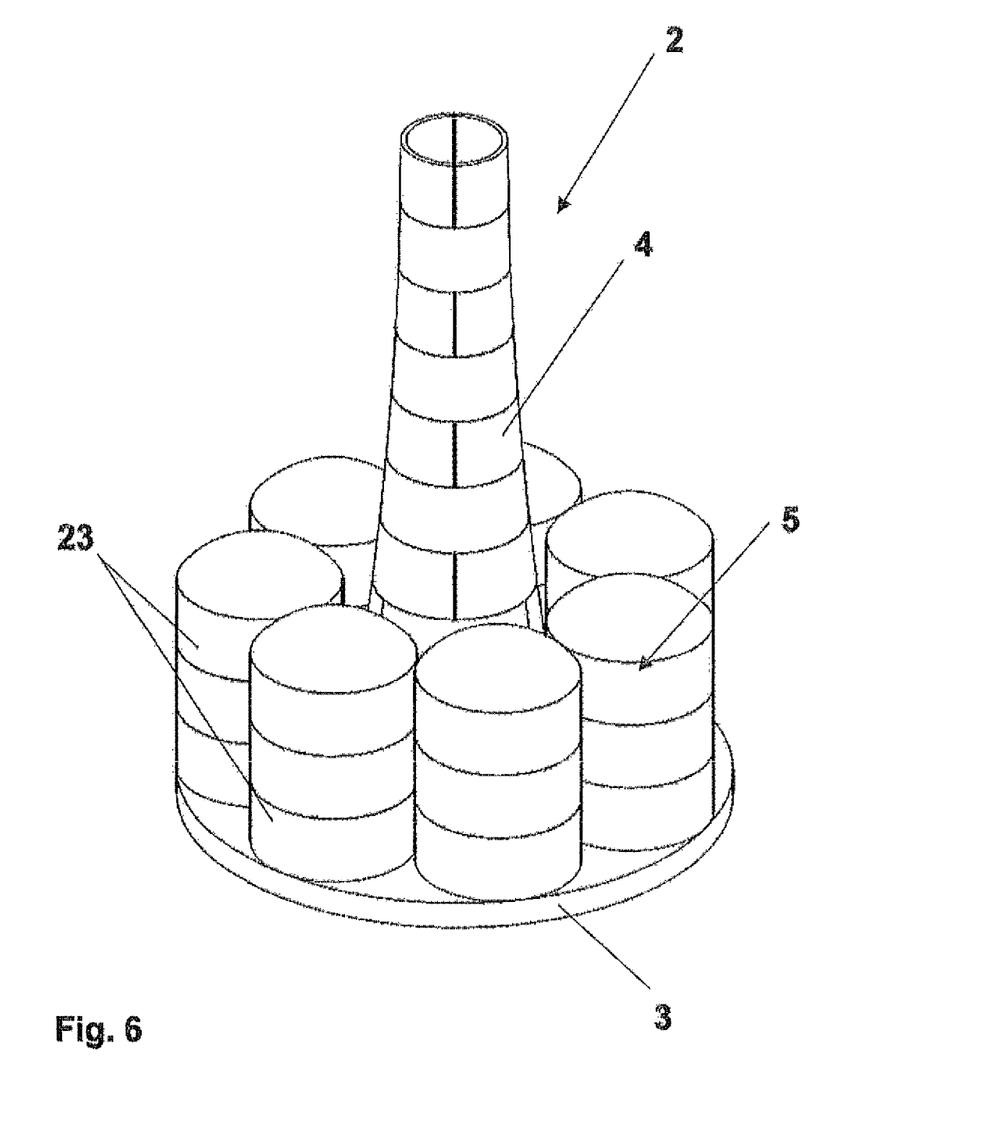
FIG. 6: A perspective drawing of a foundation according to the invention with barrel-shaped containers.

FIG. 6 shows another execution of the invention in which the floating body 5 consists of several barrel-shaped containers 23. These barrel-shaped containers 23 can be made in an especially economical way because they can be designed independently from the dimensions of the foundation 2 and the base 4. The containers 23 are also annularly arranged around the base 4 to create the floating body 5. Even in this execution, the foundation 2 has good floating stability. As described above (FIG. 5), the containers 23 can be selectively flooded to have better control of the sinking process and prevent a tilting of the foundation 2. Preferably, the sinking process is initiated by flooding the containers 23 and the interior of the base 4 first. Afterwards, only the containers continue to be flooded to sink the foundation 2 fully and uniformly to the sea floor 13. After the foundation 2 has been sunk, the containers 23 can be dismounted and reused for other stations 1. To achieve an adaptation to different dimensions of stations 1, the number of containers 23 can be correspondingly reduced or increased.

Furthermore, according to the embodiment shown in FIG. 6, the individual containers 23 can be made of steel, concrete or concrete components or a combination thereof. Thus, the lower ring segments of the barrel-shaped containers 23 can be made of concrete, for example, and after sinking the foundation 2 remain at the mounting location, while detachable steel containers are arranged above the ring segments.

Depending on the design of the station 1 and the bottom slab 3, the floating bodies can also be filled with a filling material, however, and remain on the bottom slab 3 or used for creating a biotope.

After completion of the foundation 2 with the base 4 and the floating body 5 on a floating pontoon or something similar in the inner harbor area, the floating pontoon is finally towed to deeper waters and unloaded so the foundation 2 floats by itself in its mounting position. The depth of the foundation 2 in the floating state is preferably 6 to 10 meters here, so that drainage near the harbor or in the inner harbor area is possible. Afterwards, the foundation 2 is towed to the mounting location, where it is sunk to the sea floor 13 by selectively flooding the chambers 22 or containers 23, as shown in FIG. 2.

The preparation of the sea bed is done conventionally here by stone filling but other scour protection measures are also conceivable, however. Especially in an execution in which the floating body 5 is removed after sinking the foundation 2, scour protection must be heeded. Thus, for example, when the floating bodies are dismounted, the bottom slab protruding from the remaining tower can be equipped with guiding devices for the current. These guiding devices can naturally be placed on top afterwards too or mounted around it so that as a result of this a washout of the bottom slab is hindered or at least restricted. This is especially a good idea in the North Sea.

Optionally, however, the foundation 2 (as shown in FIG. 1) can be sunk on piles 24 if bottom conditions make this necessary. The piles 24 can support the foundation 2 at the height of the sea bottom or also do it with a predetermined distance above it. To achieve this, preferably three piles of roughly the same height are driven into the sea floor 13. In this case, the foundation 2 is braced at first to the piles 24 to achieve the correct orientation. With the help of the clamping devices not shown here, a fine adjustment takes place and afterwards the space 25 between the piles 24 and the foundation 2 is cast. Finally, the foundation 2 or the floating body 5 is fully flooded.

In another embodiment of the invention, the floating body 5 can be flooded first and sunk on the piles 24 for the fine adjustment. In order to connect the piles 24 with the foundation 2 and to achieve an orientation at precisely the same level, the floating body 5 can be lifted a bit by partially pumping the water out of the floating body 5 and a space 25 between the piles 24 and the underside of the foundation 2 be filled with a casting compound. If in this design the bottom slab 3 does not lie directly on the subsurface, then the water can flow through the piles 24 under the bottom slab so no additional scour protection measures are needed. After the foundation has been sunk, the floating body 5 and the corresponding containers or buoyancy bodies can be dismounted if need be.

If the foundation 2 is directly placed on top of the sea bottom in case of a suitable subsurface (i.e. without piles 24), then it is advantageous if the foundation 2 or the bottom slab is at least partially, preferentially but fully undergrouted with undercast mortar, for example. In this process, the foundation is straightened with respect to the sea floor and finely adjusted and fixed in place by the bottom grouting.

After the foundation has been sunk at the mounting location, the wind power station 1 is finally completed with the tower 6, the machine gondola 7 and the rotor 8 at the mounting location. In this case, a tower 6 made of concrete components 27 or a steel tower can be used.

The concrete components 15, 16, 27 of the base 4 or also of a tower 6 of the wind power station 1, which like the base 4 can be built up of prefabricated parts 15 or annular segments 16 in the manner described above, are braced preferentially dry (i.e. without using a sealing or composite material such as epoxy) on top of each other. In this case, the concrete components 15, 16, 27 can also be ground before bracing to achieve a smooth supporting surface and a good connection with the correspondingly adjacent prefabricated part 15, 27. The contact points of the prefabricated parts 15, 27 can have smooth surfaces or also a shear interlocking. They can serve not only for absorbing forces but also for the precisely positioned arrangement of the prefabricated parts 15, 27 with respect to one another. Likewise, the prefabricated parts 19 of the floating body 5 can also be mounted in the manner described above.

Finally, a fastening flange 18 (as shown in FIG. 3) can be arranged on the base 4 to arrange, if need be, a pre-manufactured steel tower 6 on the base 4 at the mounting location. The flange 18 can in this case be executed as a threaded flange or also as a clamping device flange. For this purpose, the fastening flange 18 is ring-shaped and has mainly a U- or L-shaped cross section. The steel tower can be pre-manufactured in this case or be put together not until it is at the location from individual (for example, annular) elements with the corresponding flanges.

If, on the other hand, the tower 6 is built up from concrete components 27, then it is braced like the base 4 against the bottom slab 3 and/or against the base 4. In this case, the tensioning elements can run in cladding tubes of the walls of the concrete components 15, 27 or arranged outside, in which case they run preferentially in the interior space of the base 4 or of the tower 6. Furthermore, it is also possible to have anchors at various heights, both on the base 4 and the tower 6, and to brace the tower 6 and the base 4 only over a partial length. This facilitates subsequent tensioning. Such anchors can also be placed inside or outside. It is additionally also possible to pull the tensioning elements that run in the interior space 17 of the base 4 or of the tower 6 towards the exterior on a coupling spot to facilitate the tensioning process.

It could also be possible to pump dry at least the interior space 17 of the base 4 for use as instrument or storage room. In this case, it may be advantageous to also empty the interior space 26 of the floating body 5 and to fill it with sand, pebbles or another dense filling material in order to provide the foundation 2 with the needed weight. Depending on soil composition, it can also be advantageous to fill the interior space 17 of the base 4 with a filling material too. On the other hand, the ring room 26 of the floating body can also be partially pumped dry, at least when it is subdivided into chambers 22, for use as storage too.

The invention is not restricted to the embodiments shown. For example, the foundation 2 can also naturally have a non-circular design. Consequently, the floating body 5 with the ring-shaped design must not have a circular ring shape either, but can also have another closed shape, for example an oval. The floating body cannot be ring-shaped or be executed as an open ring if, as a result of this, a stable position of the foundation can nonetheless be ensured. Variations and combinations within the framework of the patent claims also fall under the invention.

What is claimed is:

1. An offshore wind power station, comprising:
   a superstructure mounted atop a foundation at an offshore mounting location, the foundation further comprising:
      a bottom slab;
      a base arranged on the bottom slab with an upright height so as to extend above the surface of the water when the foundation is sunk at the mounting location, the base configured for mounting of the superstructure atop thereof; and
      the base comprising a plurality of stacked prefabricated annular concrete components braced dry against each other without additional sealing materials between the stacked annular concrete components.

2. The offshore wind power station as in claim 1, wherein a bottommost one of the base concrete components is braced dry against the bottom slab.

3. The offshore wind power station as in claim 1, further comprising ground contact points defined between adjacent ones of the base concrete components.

4. The offshore wind power station as in claim 3, further comprising at least a partial shear interlocking between adjacent ones of the base concrete components.

5. The offshore wind power station as in claim 1, wherein the superstructure comprises a plurality of stacked prefabricated annular concrete components braced dry against each other.

6. The offshore wind power station as in claim 5, further comprising ground contact points defined between adjacent ones of the superstructure concrete components.

7. The offshore wind power station as in claim 6, further comprising at least a partial shear interlocking between adjacent ones of the superstructure concrete components.

8. The offshore wind power station as in claim 5, further comprising bracing elements for at least one of the base concrete components or superstructure concrete components, the bracing elements arranged outside of an outer wall of the base or superstructure concrete components.

9. The offshore wind power station as in claim 8, wherein the bracing elements comprise anchor points at various heights on the base or superstructure, wherein the base or superstructure are braced only over a partial length thereof.

10. The offshore wind power station as in claim 1, wherein the base further comprises an annular fastening flange at a top thereof configured for mounting the superstructure to the base.

11. The offshore wind power station as in claim 1, wherein the bottom slab comprises a circular, ring-shaped contact area on an underside thereof.

12. The offshore wind power station as in claim 1, wherein the foundation further comprises an annular floating body arranged on the bottom slab around the base, the floating body configured for being flooded to sink the foundation with the base in an upright position at the mounting location.

13. The offshore wind power station as in claim 12, wherein the floating body comprises annularly segmented containers arranged around the base.

14. The offshore wind power station as in claim 13, wherein the containers comprise barrel-shaped containers arranged around the base.

15. A method for erecting an offshore wind power station, comprising;
   prefabricating a foundation with a bottom slab and a base formed on the bottom slab;
   at an offshore mounting location, erecting a superstructure atop of the base;

wherein the base is prefabricated by stacking and dry bracing a plurality of annular concrete components against each other on the bottom slab without the use of additional sealing materials between the stacked annular concrete components.

16. The method as in claim 15, wherein a bottommost one of the base concrete components is braced dry against the bottom slab.

17. The method as in claim 15, wherein the superstructure is erected from a plurality of stacked prefabricated annular concrete components dry braced against each other.

18. The method as in claim 17, further comprising grinding contact points defined between adjacent ones of the base or superstructure concrete components prior to dry bracing the concrete components.

19. The method as in claim 17, further comprising bracing at least one of the base concrete components or superstructure concrete components with bracing elements arranged outside of an outer wall of the base or superstructure concrete components.

* * * * *